Nov. 5, 1935.                H. WALCH                2,019,944
                   CENTRIFUGAL TREATMENT OF VISCOSES
                          Filed May 25, 1934
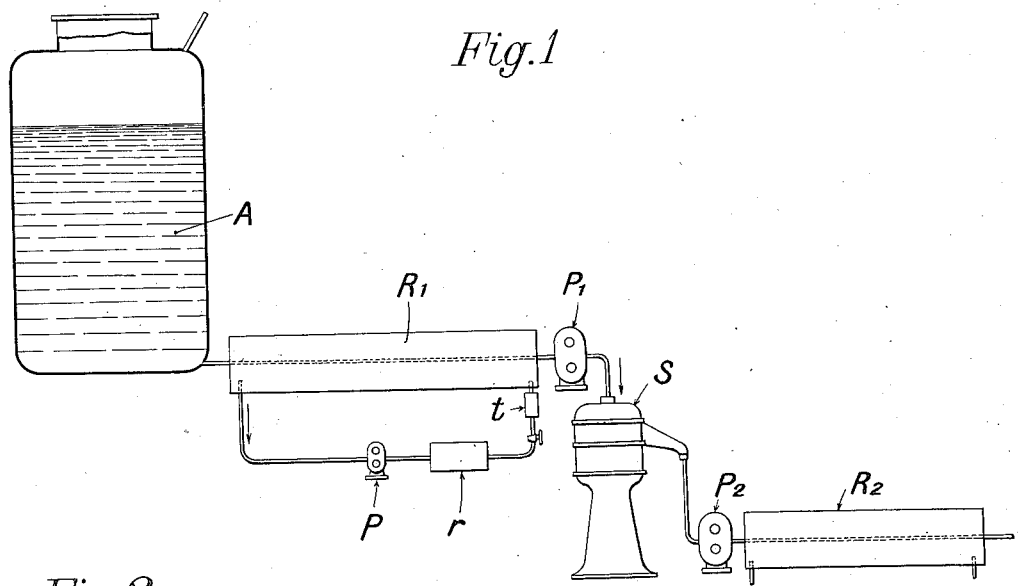
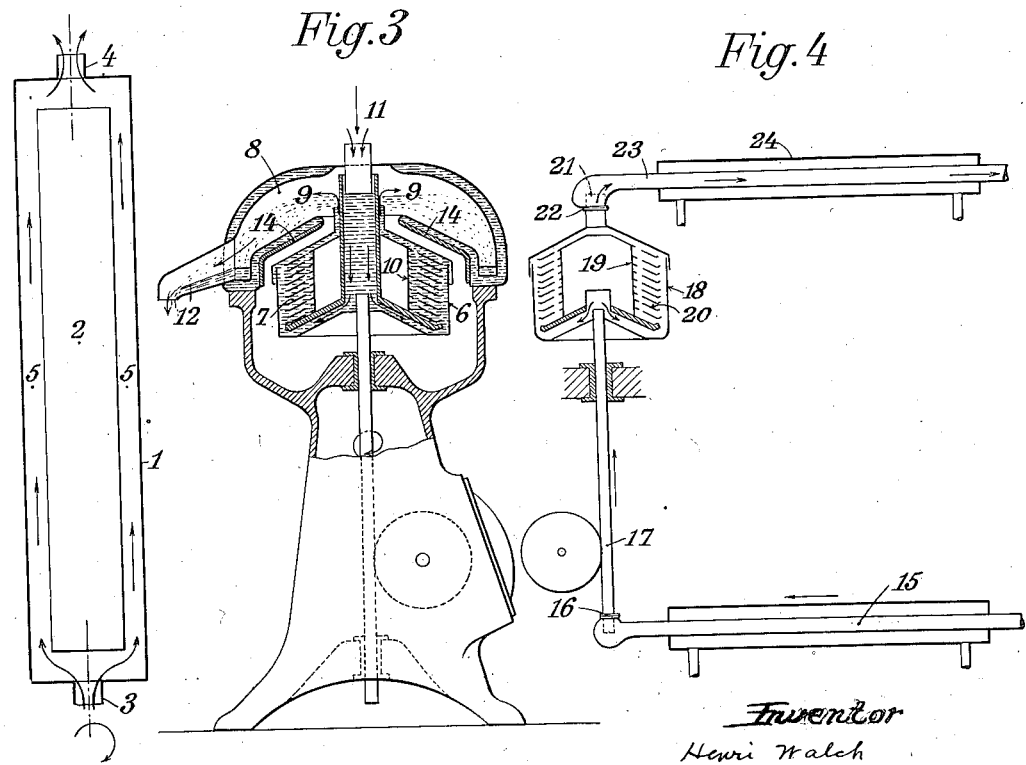

Patented Nov. 5, 1935

2,019,944

UNITED STATES PATENT OFFICE 2,019,944

CENTRIFUGAL TREATMENT OF VISCOSES

Henri Walch, Paris, France, assignor to The De Laval Separator Company, New York, N. Y., a corporation of New Jersey Application May 25, 1934, Serial No. 727,434
In France May 27, 1933

3 Claims. (Cl. 260—100)

Cellulose xanthogenate issuing from the kneaders in which it has been formed must be clarified, freed from gases and ripened before being led to the spinnerette.

The clarification of viscoses is most often effected by three successive filtrations on cotton wool cakes arranged in frame filters.

The first filter is often replaced by a high speed centrifugal separator through which the viscose continuously passes and where it leaves its heaviest impurities.

The removal of the gases and the ripening of the viscose are then effected during a period of rest of several days in storage tanks, maintained under vacuum and at a rigorously constant temperature, in which the occluded gases slowly escape from the viscose through the free surface and in which it ripens at a nearly invariable rate.

The inconvenience of this modus operandi is known: the centrifugation of viscose, which is an economical operation, can only replace one filtration, since the high viscosity of cellulose xanthogenate at ripening temperature does not allow a better purification when commercial output is under consideration.

The removal of the gases from a product as viscous as cellulose xanthogenate slowly and incompletely takes place in tanks where the free surface of the liquid is small relatively to its volume.

The shape of the storage vessels and the viscosity of the product do not allow of varying the temperature for reducing or increasing, at will, the ripening period.

The present invention is adapted to increase the efficiency of centrifugal purification in order to reduce the clarification expenses, to simultaneously effect centrifugal clarification, removal of the gases and ripening of viscose so as to reduce the storage period, between the purifier and the spinning apparatus, to the length of time strictly necessary and desirable.

This invention is based on the three following remarks:

(a) The fluidity of viscose very rapidly increases with its temperature; it nearly doubles for each interval of 5° C.;

(b) The purification of a liquid by centrifugal force is so much the more complete as this liquid is of greater fluidity and, for one and the same liquid, the final degree of purification increases more rapidly than the fluidity;

(c) The ripening of viscose measured by its saline index is so much the more rapid as the temperature at which it is maintained is higher.

At 15° C. the coagulating period is of several days at an intermediate temperature comprised between 60° and 95° C. variable according to the viscoses, it is instantaneous.

The invention consists:

1. In increasing the fluidity of the viscose by rapidly heating it, without local overheating, at the highest possible temperature without coagulating it, in causing it to pass in a high speed centrifugal separator, the bowl of which retains the greater part of the impurities in suspension, and in suddenly cooling it after centrifugation, before sending it to the storage tanks or to the finishing filters.

2. In maintaining an atmosphere of a neutral gas (which does not contain any carbon dioxide), preferably at a greatly reduced pressure, in the receivers of the centrifugal separator in which the viscose is atomized after clarification, in order to avoid carbonation of alkali-cellulose and so as to take advantage of the large free surface of the fluidified viscose droplets projected at a high speed outside the bowl, for instantaneously and completely removing the gases from this viscose.

3. In controlling the speed of cooling after centrifugation, so as to obtain, at the end of the operation, the desired ripening effect.

A plant for the treatment of viscose according to the invention will now be described, by way of example only.

Fig. 1 is a diagrammatic view of a plant according to the invention.

Figs. 2 to 4 illustrate preferred arrangements of the centrifugal separator.

Raw viscose is placed in a tank A (Fig. 1) which is hermetically closed. A sufficient air pressure is exerted in this tank for causing the viscose to circulate at an accelerated speed in the tubular heater $R^1$, of small useful volume. The heating fluid is, preferably, water which is automatically maintained at a constant temperature slightly higher than the final desired temperature of the viscose, by means of a pump $p$, of a steam heater $r$, and of a thermostat $t$ acting on the steam inlet.

The heated and fluidified viscose enters the closed centrifugal separator S, the output of which is determined by the volumetric pump $P^1$, the speed of which can be regulated at will.

In the bowl or rotor of the centrifugal separator, the viscose abandons the greater part of the impurities it contains.

When issuing from the rotor, the shape of which is chosen for that purpose, it is atomized at a high speed in the fluidtight receiver where the pressure is reduced to a value approximating but higher than the tension of the water vapour at the temperature under consideration.

The evolution of the occluded gases from the viscose instantaneously and completely takes place. The viscose, purified and freed from gases, is rapidly cooled by circulation in the pump $P^2$ and in the cooler $R^2$.

The temperature of the cooling fluid is so chosen as to give to the viscose issuing from the cooler the desired saline index.

The present invention comprises the use, for heating the viscose of an electric heater acting by the Joule effect of an alternating current circulating through the viscose. In such an apparatus, local overheating is completely avoided, and the speed of circulation of the viscose and the driving pressure are reduced to the minimum.

It is advantageous to use an improved centrifugal separator as will now be described with reference to Figs. 2 to 4, in such a manner that the hot viscose remains in the said separator during the shortest period of time possible; this allows of treating viscose without inconvenience at a higher temperature and, consequently, in a condition of greater fluidity, during the short purification phase; it will therefore be possible to heat the viscose, at the moment it is to be introduced in the separator, to the highest temperature consistent with the required reduction of the saline index.

The desired result is obtained by reducing the capacity of the bowl by means of a relatively large central core; the volume of viscose contained in the bowl is thus reduced, thus diminishing, for a given output of viscose, the length of time it has to remain in the bowl, and notwithstanding this, the efficiency of the purification is increased for the reason that the viscose is of greater fluidity and because it is subjected to the action of centrifugal force particularly in the peripheral zone where this force is maximum.

In Fig. 2, the separator is constituted by a tubular bowl 1 within which a hollow cylinder 2 constitutes a large core, so that the hot viscose entering the connection branch 3 and issuing through the connection branch 4, passes through the annular space 5 of small capacity, where it is purified by the action of centrifugal force.

Referring to Fig. 3, the separator comprises a bowl 6 with conical discs 7 and a receiver 8, of great capacity, for the viscose atomized at 9. The central portion of the bowl is occupied by a core 10 of large volume.

The hot viscose is admitted at 11 and issued at 12; it passes between the discs 7 arranged in the annular space of small capacity comprised between 10 and 6, and is subjected therein to the action of centrifugal force; it is atomized at 9 and is freed from gases within the receiver 8.

In order to accelerate cooling of the viscose, the walls of the receiver 8 are cooled by a jacket 13 through which circulates cold water or brine. Moreover, a layer 14 of heat insulating material is arranged under the bottom of the receiver, in order to avoid exchange of heat between the upper part of the bowl containing hot viscose and the interior of the receiver where the viscose is to be cooled.

Fig. 4 shows a modification more particularly applicable to viscoses which need not be freed from gases. Hot viscose is led, through a conduit 15, to a stuffing-box 16 surrounding the hollow shaft 17 of the separator; it is admitted, through this shaft, into the bowl 18 containing a core 19 and conical discs 20, then it issued from the upper part of the bowl through a connecting branch 21, provided with a stuffing-box 22 and opening in a conduit 23 passing through a jacket 24 through which cold water circulates. In these conditions, the time taken for centrifugation is reduced, owing to the presence of the core 19, and the viscose is cooled immediately afterwards, so that it is possible to raise it to the highest temperature possible immediately before its introduction in the centrifugal separator.

It is to be understood that these forms of construction are given by way of examples only and not in a limiting sense. They have, however, definite advantages over other forms of construction and are the subject-matter of a divisional application filed July 3, 1935, Serial No. 29,683.

I claim:

1. Process for clarifying viscose by centrifugation, which consists in rapidly heating the viscose to a temperature below its point of instantaneous coagulation in order to render it as fluid as possible, in clarifying the viscose in this condition in a high speed centrifugal purifier, and in subsequently cooling it at a speed which is controlled according to the saline index which is to be given to the viscose.

2. Process for clarifying viscose by centrifugation, which consists in rapidly heating the viscose to a temperature below its point of instantaneous coagulation in order to render it as fluid as possible, in centrifugating the viscose in this condition and in atomizing it in a closed space under partial vacuum in order to very rapidly free it from gases, and in subsequently cooling the viscose freed from gases at a speed which is controlled according to the saline index which is to be given to the viscose.

3. Process for clarifying viscose by centrifugation, which consists in rapidly heating the viscose to a temperature below its point of instantaneous coagulation in order to render it as fluid as possible, in centrifugating it in this condition and in atomizing it in a closed spaced filled with a gas free from carbon dioxide and under partial vacuum, and in subsequently cooling the viscose freed from gases at a speed which is controlled according to the saline index which is to be given to the viscose.

HENRI WALCH.